Figure 3:
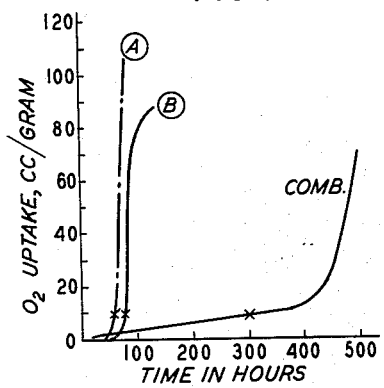

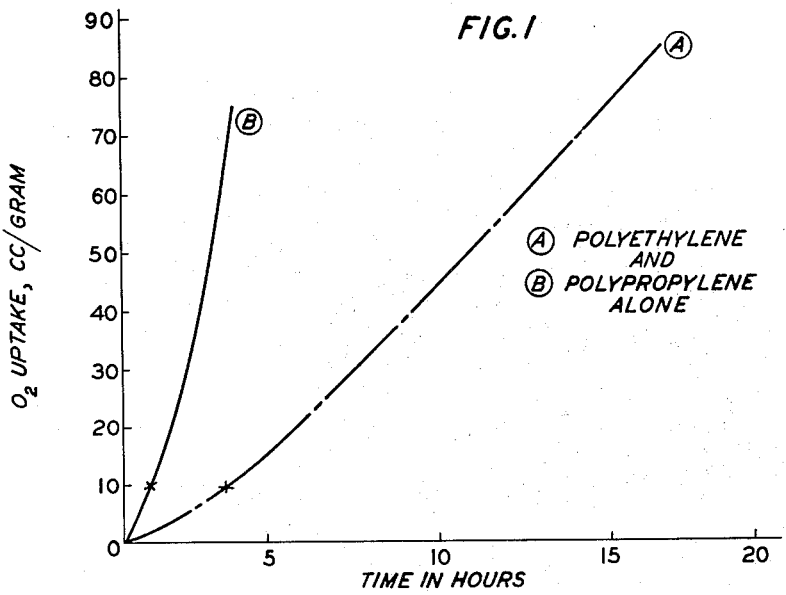
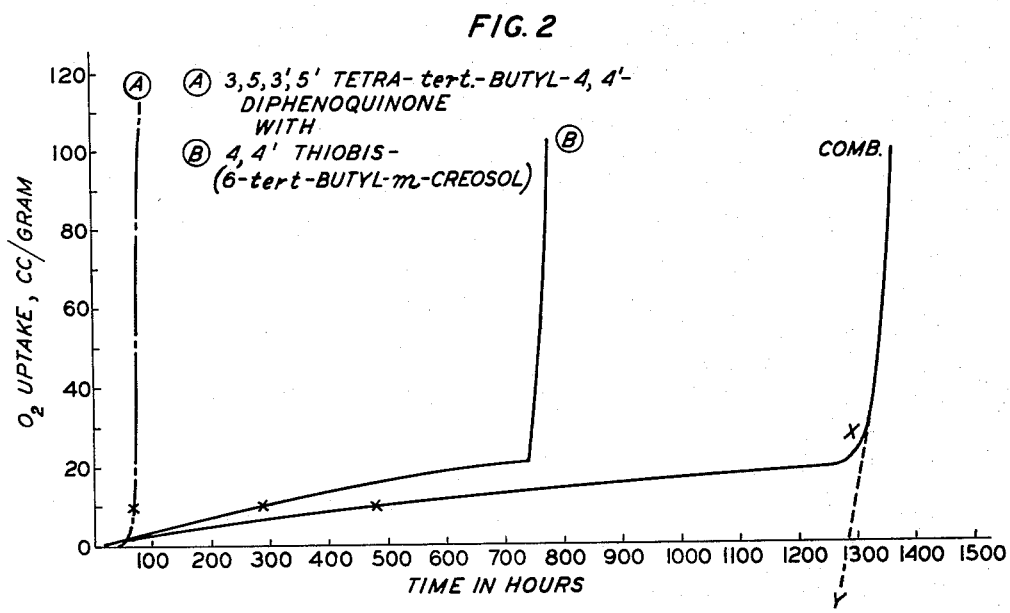

July 5, 1966  W. L. HAWKINS ETAL  3,259,604
STABILIZED LONG-CHAIN POLYMERS
Filed April 24, 1964  5 Sheets-Sheet 2

(A) 3,5,3',5'-TETRA-tert.-BUTYL-4,4'-DIPHENOQUINONE WITH
(B) TETRAMETHYL THIURAM DISULFIDE (A) 3,5,3',5'-TETRA-tert.-BUTYL-4,4'-DIPHENOQUINONE WITH
(B) DI-β-NAPHTHYL DISULFIDE (A) 3,5,3',5'-TETRA-tert.-BUTYL-4,4'-DIPHENOQUINONE WITH
(B) 2-NAPHTHALENETHIOL

INVENTORS W. L. HAWKINS
M. A. WORTHINGTON
BY
ATTORNEY

July 5, 1966 W. L. HAWKINS ET AL 3,259,604
STABILIZED LONG-CHAIN POLYMERS
Filed April 24, 1964 5 Sheets-Sheet 3
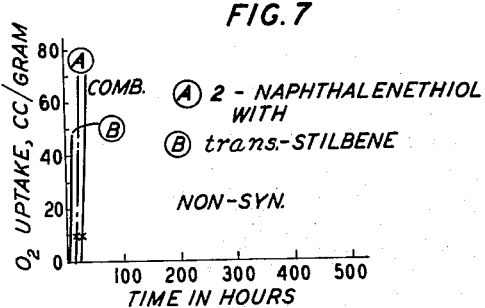
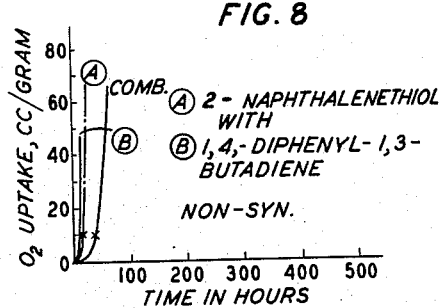
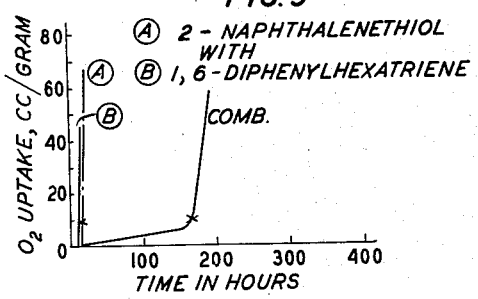
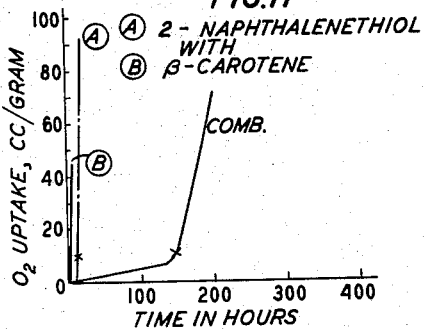
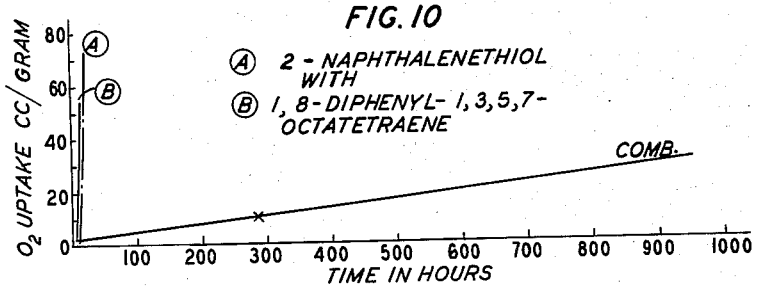
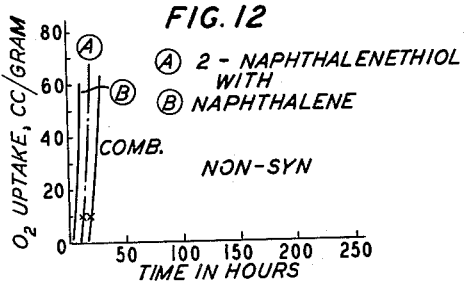
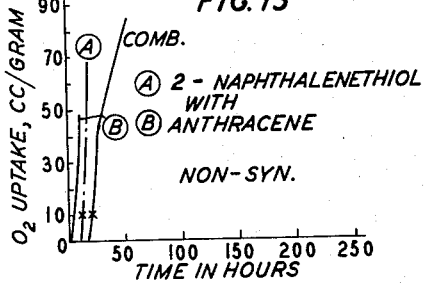
INVENTORS
W. L. HAWKINS
M. A. WORTHINGTON
BY
ATTORNEY

Ⓐ 2-NAPHTHALENETHIOL
WITH
Ⓑ NAPHTHACENE

Ⓐ 2-NAPHTHALENETHIOL
WITH
Ⓑ PENTACENE

Ⓐ 2-NAPHTHALENETHIOL
WITH
Ⓑ PERYLENE

Ⓐ 2-NAPHTHALENETHIOL
WITH
Ⓑ DUROQUINONE
NON-SYN.

Ⓐ 2-NAPHTHALENETHIOL
WITH
Ⓑ tert-BUTYL ANTHRAQUINONE
NON-SYN.

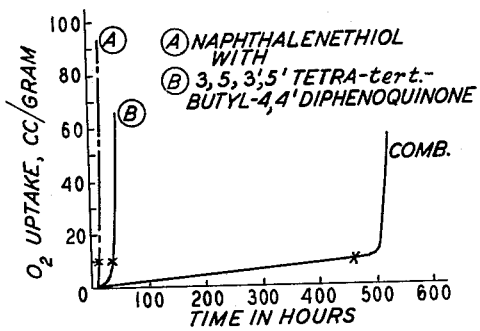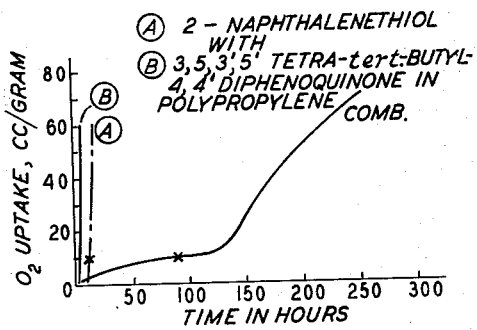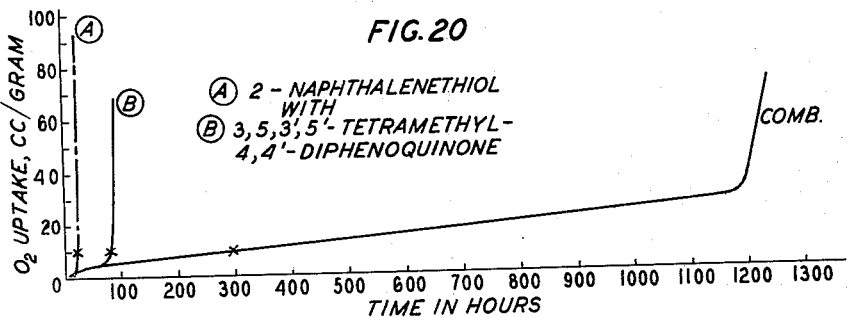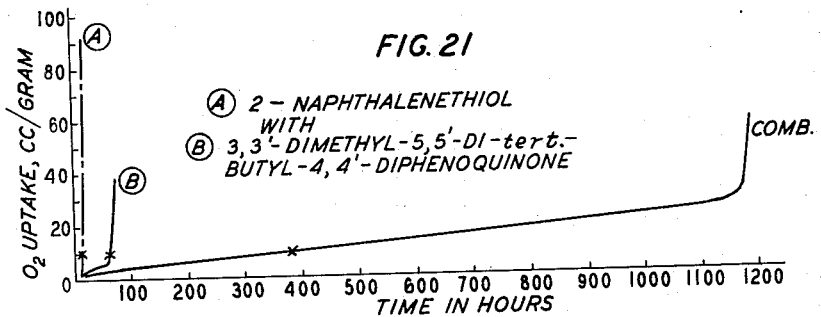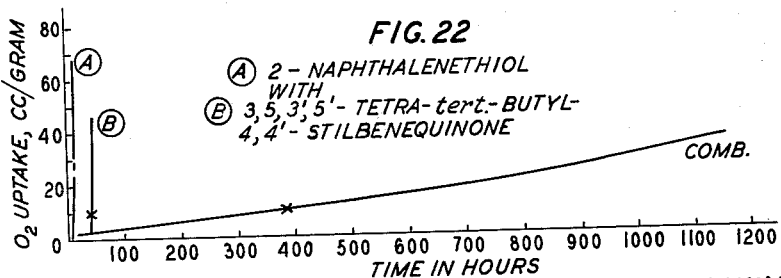

United States Patent Office 3,259,604
Patented July 5, 1966

3,259,604
STABILIZED LONG-CHAIN POLYMERS
Walter L. Hawkins, Montclair, N.J., and Mary Ann Worthington, Monroe, Conn., assignors to Bell Telephone Laboratories, Incorporated, New York, N.Y., a corporation of New York
Filed Apr. 24, 1964, Ser. No. 364,882
15 Claims. (Cl. 260—45.9)

This invention relates to stabilized polymeric materials. Further, it relates to essentially saturated hydrocarbon polymeric materials having included therein small amounts of additives which have been found to exhibit a retarding effect on deleterious oxidation of the material. This invention is primarily directed to inhibiting so called thermal oxidation in polymers by the addition of certain combinations of organic materials which have been found to produce a cooperative synergistic effect.

This application is a continuation of copending application Serial No. 26,110, filed May 2, 1960, now abandoned.

Considerable study has been devoted to the effects and prevention of thermal oxidation in the more common saturated polymers, particularly polyethylene. Thermal oxidation, as concerned with here, is oxidation normally occuring in ordinary atmospheres essentially independent of ultraviolet light which varies or accelerates with increasing temperature. "Antioxidant" materials have consequently been developed which provide a marked retardation of thermal oxidation. Such antioxidants as known in the prior art characteristically required an antioxidant radical such as a secondary amino group or a hydroxyl group attached to an aromatic ring. These compounds result in a resonant stable structure. Typically, such compounds further contain additional substituents such as branched or normal aliphatic groups. A more thorough treatment of antioxidant materials and mechanisms can be found in G. W. Wheland's "Advanced Organic Chemistry," 2nd Edition, Chapters 9 and 10.

The particular polymeric materials adapted to be treated by this invention are polymers containing tertiary hydrogen atoms. Such polymers are of two general types; those containing random numbers and spacing of tertiary hydrogen atoms such as polyethylene and those containing ordered hydrogen atoms such as polypropylene. This invention concerns either type and mixtures thereof or copolymers containing one or more of either type. Specific compounds appropriate for this invention are polymers of olefins such as polyethylene, polypropylene, poly-butene-1, poly-3-methyl butene-1, poly-4-methyl pentene-1, poly-4,4-dimethyl pentene-1, poly-dodecene-1, and poly-3-methyl pentene-1.

Although the most common polymeric materials falling within the class above outlined are the polymerization products of monomers containing four or fewer carbon atoms, polymerized products of higher order monomers may also be stabilized in accordance with this invention providing they contain tertiary hydrogen atoms as may copolymers and mixtures containing such polymers. For a discussion of the oxidative mechanism against which protection is imparted in accordance with this invention, see "Modern Plastics," volume 31, pages 121 to 124, September 1953.

Some of the polymeric materials included in the class above set forth have already attained considerable commercial importance; notably, polypropylene and the various types of polyethylene. Some of the other materials in this class have excellent electrical and mechanical properties and will doubtlessly find widespread use in the near future.

Many of the most important applications of polyethylene such as its use in cable sheathing, depend on its very good mechanical properties such as high tensile strength and abrasion resistance coupled with its resistant properties against water and water vapor. Other uses take advantage of its high dielectric strength in applications such as primary insulation of wire conductors. The consequences of thermal oxidation in such materials are low temperature brittleness, impairment of tensile strength and poorer dielectric properties. Accordingly, successful use of these materials in applications now contemplated requires the use of good antioxidant materials.

We have now discovered two classes of materials which, when combined and incorporated in small amounts into polymers of the class outlined above, provide an antioxidant effect of a degree beyond any expectation and which compares with corresponding polymers treated with the most effective commercial antioxidants.

The two classes of materials which together form the synergistic antioxidant mixture according to this invention are:
(1) Sulfur containing compounds of various specific groups as hereinafter set forth; and
(2) Conjugated compounds having long chains of unbroken conjugation.

Referring first to the sulfur containing compound, the following specific groups have been found to be effective stabilizer materials when synergized with the conjugated compounds:

Various aromatic thioethers, aliphatic and aromatic disulfides, aliphatic and aromatic mercaptans and aliphatic thiuramdisulfides.

This class of specific sulfur compounds has previously been found to be synergistic in a different system as set forth in copending applications of Hawkins et al. which were filed November 29, 1956, and issued January 10, 1961, Serial No. 625,577, now United States Patent No. 2,967,850; Serial No. 625,068, now United States Patent No. 2,967,846; Serial No. 625,110, now United States Patent No. 2,967,849; Serial No. 625,109, now United States Patent No. 2,967,848; Serial No. 625,108, now United States Patent No. 2,967,847; Serial No. 672,062, which was filed July 15, 1957, now United States Patent No. 2,889,306, issued June 2, 1959; and Serial No. 625,184, which was filed November 29, 1956, now abandoned. It is this same class of sulfur compounds which are intended to be within the scope of this invention.

The groups are more specifically set forth as follows:
The specific aromatic thioethers are here distinguished by two groups. Aromatic phenolic thioethers and diaryl thioethers. The aromatic phenolic thioethers all contain as substituents in addition to one or more hydroxyl groupings at least one normal or branched alkyl grouping which probably serves the function of sterically hindering the antioxidant functional group. The general formula for these antioxidants which, when combined with the conjugated compound in a polymeric material such as polyethylene, comprises this invention is:

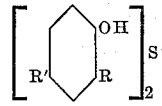

in which $x$ is an integer of from 1 to 3, R is a normal alkyl group containing from 6 to 20 carbon atoms or a branched alkyl group containing from 3 to 6 carbon atoms and R' is either hydrogen or normal alkyl group containing up to 6 carbon atoms. In the general formula above, the total number of carbon atoms contained in an entire moiety of the molecule should not exceed about 30 since a greater number of carbon atoms results in impractical compounds difficult and expensive to obtain. Examples of compounds falling within the scope of the general formula above may be found in copending application of Hawkins et al., Serial No. 625,184, now abandoned, which application also contains a more thorough treatment of this group. Aromatic thioethers of this invention also include the diaryl monosulfides of the general formula $A_r$—S—$A_r'$ in which $A_r$ and $A_r'$ are fused aromatic ring structures, such as naphthyl or anthryl containing at least one ring substituent selected from the group consisting of hydroxyl radicals and secondary amine radicals and which may contain one or more additional ring substituents such as, for example, hydrocarbon radicals containing up to 20 carbon atoms, however, again with a proviso that the total number of carbon atoms in either moiety including substituents shall not exceed 30. Examples of this group of carbons can be found in Hawkins et al., Serial No. 625,068, now United States Patent No. 2,967,846, issued January 10, 1961.

The aliphatic disulfides fall within the general formula $(R—S—S—R')_x$ in which R and R' are aliphatic radicals such as, for example, butyl or higher order homologs of the alkyl series and in which one or more hydrogen atoms may be replaced by a hydrocarbon substituent or other substituent known to be inert with respect to the polymer to be stabilized such as nitrogen, and $x$ is an integer of at least 1. The R and R' moieties of these compounds may be identical or not, the only requirement additional to those set forth being a restriction of the number of carbon atoms in each moiety including substituents in the exclusive range of from 4 to 30. The lower limit of 4 carbon atoms is necessitated by the high vapor pressure of compounds of this class containing fewer carbons resulting in practical difficulty in introducing the material into the polymer, while the upper limit of 30 carbons is directed primarily to ease of compounding the polymeric materials and to dilution of the antioxidant effect based on the weight percentage range which is practical. A more thorough treatment of these compounds and examples thereof appear in copending application of Hawkins et al., Serial No. 625,108, now United States Patent No. 2,967,847, issued January 10, 1961.

The aromatic disulfides of this invention include the di-cyclic-disulfides falling within the general formula R—S—S—R' in which R and R' are ring structures such for example as phenyl, naphthyl, anthryl, thiazole or other aromatic or heterocyclic radicals and S is a sulfur atom. Either or both of the cyclic moieties of these compounds may additionally contain one or more aliphatic substituents providing that the total maximum number of carbon atoms in the moiety is 30. Examples of compounds falling within this group may be found in copending application of Hawkins et al., Serial No. 625,577, now United States Patent No. 2,967,850, issued January 10, 1961.

The mercaptans within the scope of this invention fall within the general formula $R—(SH)_x$. R is either an aliphatic radical having from 6 to 30 carbon atoms including substituents or an aromatic ring structure, for instance, phenyl, naphthyl, anthryl, thiazole or other aromatic or heterocyclic group, having a maximum of 30 carbon atoms in the molecule. A more complete treatment of this group of compounds and examples thereof can be found in copending applications of Hawkins et al., Serial No. 625,109, now United States Patent No. 2,967,848, issued January 10, 1961, and Serial No. 625,110, now United States Patent No. 2,967,849, issued January 10, 1961.

The aliphatic thiuramdisulfides appropriate to the invention fall within the general formula

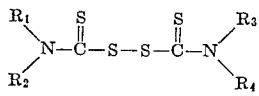

in which $R_1$, $R_2$ and $R_3$, $R_4$ are aliphatic radicals such as, for example, methyl or higher order homologues of the alkyl series and in which one or more hydrogen atoms may be replaced by a hydrocarbon substituent or other substituent, such as nitrogen, known to be inert with respect to the polymer to be stabilized. The $R_1$, $R_2$, $R_3$ and $R_4$ substituents of these compounds may be identical or not, the only additional requirement being that the sum of carbon atoms contained in each of the paired substituents $R_1$, $R_2$ and $R_3$, $R_4$ be no greater than 30. The maximum imposed on the number of carbon atoms contained in the substituents is directed primarily to ease of compounding the polymeric materials and to dilution of the antioxidant effect based on the weight percentage range which is practical. Examples of compounds falling within this group may be found in copending application of Hawkins et al., Serial No. 672,062, now United States Patent No. 2,889,306, issued June 2, 1959.

Although in many instances symmetrical sulfur compounds are set forth in the above-referred-to copending applications, it should be understood that unsymmetrical compounds of the same nature are also effective.

The second component of the mixture according to the invention is a conjugated compound of a specific nature. The compounds which synergize the above-set-forth sulfur compounds are characterized in that they exhibit a long chain of conjugation. While a certain degree of conjugation is probably necessary to show synergism, we have found that too many other factors influence the synergistic behavior for that property alone to be a valid standard. For instance, a double bond shows varying degrees of effectiveness according to whether it appears in an alkene chain, a benzene ring or a quinoid ring. This is to be expected from the well-known differences in the nature of physical or electronic attraction between carbon atoms in these systems. It is understood that these other influences are prominent primarily in the borderline cases, that is, where the degree of conjugation is a minimum, and any compound no matter how complex having at least the degree of conjugation hereinafter defined will exhibit synergism and will thus be within the scope of this invention. Accordingly, each group of compounds set forth below may be substituted at will by any stable component, branch, or system so long as it does not materially interfere with or break the continuous chain of conjugation initially present in these groups.

The particular significant groups which have the requisite degree of conjugation are:

Cyclic alkenes having the general formula:

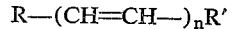

where R and R' are conjugated cyclic radicals, and $n$ is greater than 2;

Condensed polynuclear compounds having greater than three unsaturated condensed rings; and Quinones having the general formula:

where X is any conjugated system providing unbroken conjugation between the quinone rings including but one double bond (diphenoquinone).

Combinations of these two classes of compounds show a synergistic antioxidant effect which can be appreciated from an examination of the accompanying figures. All the figures are plots of accelerated oxidation tests on polymeric materials of the designated class. Each figure contains three curves, one showing the polymer containing only a sulfur compound according to the invention, one showing the polymer containing only a conjugated material according to the invention and a third showing the polymer protected with the synergistic mixture of each of these compounds. Also control curves for polyethylene and polypropylene alone have been included. The procedure used for these accelerated tests is hereinafter described. The coordinates on each figure are oxygen uptake in grams per cubic centimeter of the sample (ordinate) versus time in hours (abscissa). The oxygen uptake rate is a measure of oxidative degradation of the sample. Each of FIGS. 2 through 22 illustrates the antioxidant properties of one combination according to the invention. The curves designated A and B are control curves showing the stabilizing effect of each material separately. The letters A and B on the curves correspond to the compounds similarly marked. The third curve in each instance designated "comb." is of course the synergistic combination of compounds A and B according to the invention. FIG. 1 is included as a control curve showing uninhibited polyethylene and polypropylene. FIGS. 2 through 6 are concerned with the sulfur containing component while FIGS. 7 through 22 show the conjugate system. In FIGS. 2 through 6 each type of sulfur containing compound was tested with a typical conjugated material according to the invention, namely 3,5,3',5'-tetra-tert.-butyl-4,4'-diphenoquinone. In each of FIGS. 7 through 22, various conjugated materials were tested with a single sulfur containing material, specifically, 2-naphthalenethiol (FIG. 5). In the latter group showing conjugated materials, some compounds are included which do not show synergism in order to show limits of the degree of conjugation necessary for synergistic antioxidant behavior. These curves are designated "non-syn."

Figure 6:
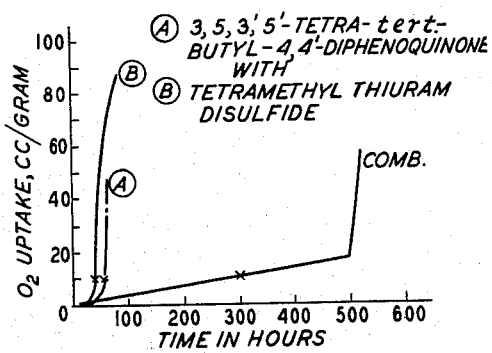
Figure 4:
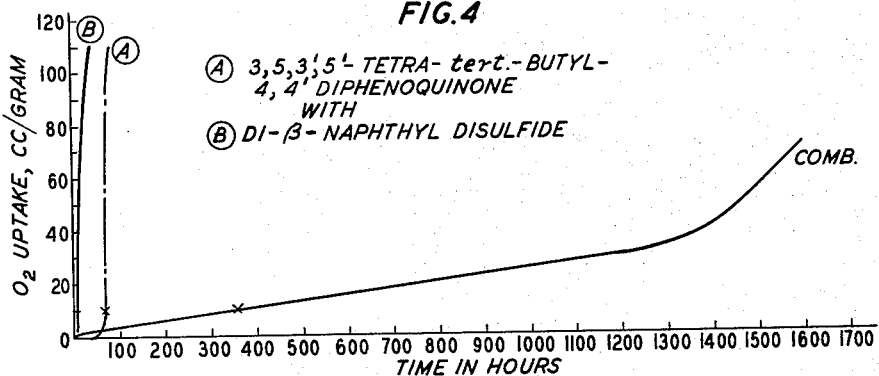
Figure 5:
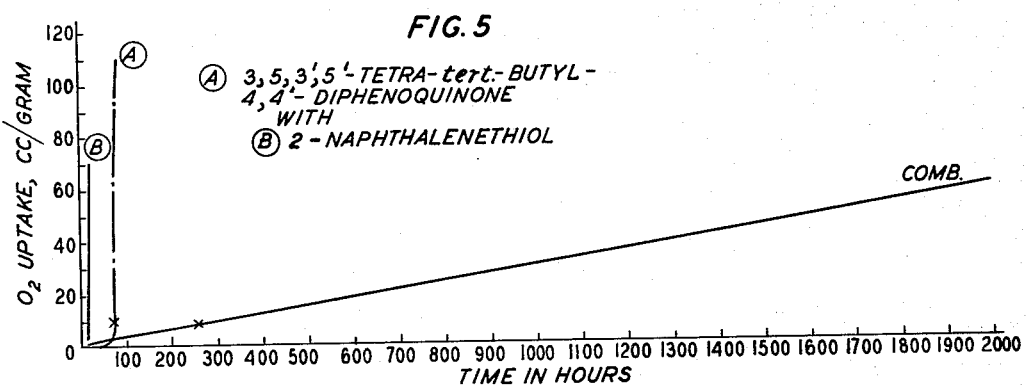

The specific combinations of compounds illustrated by each figure are:

FIG. 1, polyethylene and polypropylene in a pure, uninhibited form;

FIG. 2, an aromatic phenolic thioether, specifically, 4,4'-thiobis-(6-tertiary-butyl-m-cresol) and 3,5,3',5'-tetra-tert.-butyl-4,4'-diphenoquinone;

FIG. 3, an aliphatic disulfide, specifically, di-dodecyl disulfide with 3,5,3',5'-tetra - tert. - butyl-4,4'-diphenoquinone;

FIG. 4, an aryl disulfide, specifically, di-β-naphthyl disulfide with 3,5,3',5'-tetra-tert.-butyl-4,4'-diphenoquinone;

FIG. 5, a mercaptan, specifically, 2-naphthalenethiol with 3,5,3',5'-tetra-tert.-butyl-4,4'-diphenoquinone;

FIG. 6, a thiuramdisulfide, specifically, tetramethylthiuramdisulfide;

*Cyclic alkenes*

FIG. 7, trans-stilbene with 2-naphthalenethiol (non-synergistic);

FIG. 8, 1,4-diphenyl-1,3-butadiene with 2-naphthalenethiol (non-synergistic);

FIG. 9, 1,6-diphenylhexatriene with 2-naphthalenethiol;

FIG. 10, 1,8-diphenyl-1,3,5,7-octatetraene with 2-naphthalenethiol;

FIG. 11, β-carotene with 2-naphthalenethiol;

*Condensed unsaturated polynuclear compounds*

Figure 14:
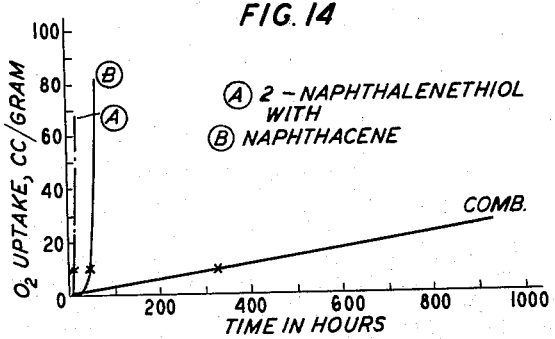
Figure 15:
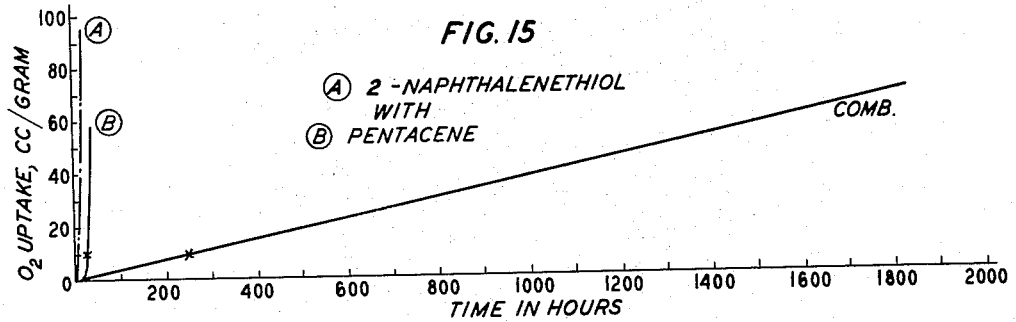
Figure 16:
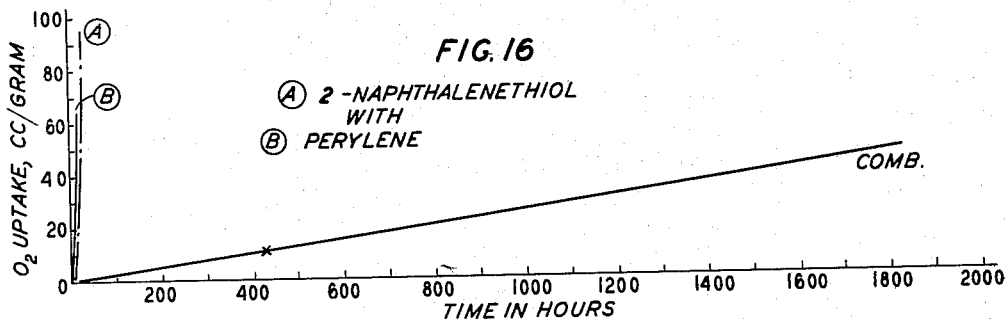

FIG. 12, naphthalene with 2-naphthalenethiol (non-synergistic);

FIG. 13, anthracene with 2-napthalenethiol (non-synergistic);

FIG. 14, naphthacene (tetracene) with 2-naphthalenethiol;

FIG. 15, pentacene with 2-naphthalenethiol;

FIG. 16, perylene with 2-naphthalenethiol;

*Quinones*

Figure 17:
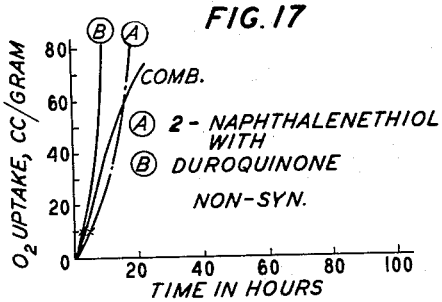
Figure 18:
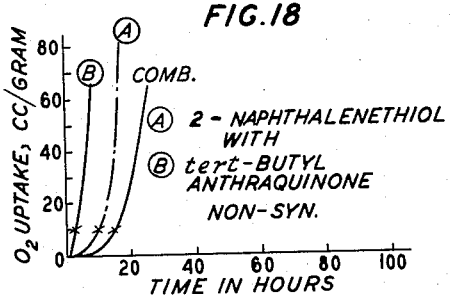

FIG. 17, duroquinone with 2-naphthalenthiol (non-synergistic);

FIG. 18, tert.-butyl-anthraquinone with 2-naphthalenethiol (non-synergistic);

FIG. 19, 3,5,3',5'-tetra-tert.-butyl-4,4'-diphenoquinone with 2-naphthalenethiol;

FIG. 20, 3,5,3',5'-tetramethyl-4,4'-diphenoquinone with 2-naphthalenethiol;

FIG. 21, 3,3'-dimethyl-5,5'-di-tert.-butyl-4,4'-diphenoquinone with 2-naphthalenethiol;

FIG. 22, 3,5,3',5'-tetra-tert.-butyl-4,4'-stilbene quinone with 2-naphthalenethiol; and FIG. 23, 3,5,3',5'-tetra-tert.-butyl-4,4'-diphenoquinone with 2-naphthalenethiol in polypropylene.

In FIGS. 1 through 22 above, the polymeric material treated with polyethylene. In order to illustrate the adaptation of the antioxidant materials of this invention to the higher order polymers, one run is reported for polypropylene. The plot for this run appears in FIG. 23.

The amounts of each component of the synergistic mixture are not critical, however, a minimum of .01% by weight of each is necessary for significant antioxidant effect. A maximum of 10% by weight of the mixture is a practical upper limit beyond which no substantial increase in effectiveness will occur. There is no requirement that the two components of the mixture be used in equal proportion, however, in all the examples appearing herein, .1% by weight of each component was used.

It was found expeditious in the experimental procedure to employ equal weight measures of each component; however, it is obvious that for each combination of components a particular weight ratio based on molecular formulas results in optimum effectiveness for a minimum of material used; however, any mixture falling within the limits above delineated—.01% by weight of each component to a combined weight of 10%—falls within the scope of this invention.

The figures presented are representative of data taken from a standard accelerated aging test for polymeric materials. Such tests are well known and data taken therefrom is of known significance. To aid the description of this invention, an outline of the accelerated testing procedure is as follows:

The saturated hydrocarbon polymer, together with a mixture of each component of the classes set forth above, was prepared by mill massing on a 6 inch by 12 inch 2 roll mill having roll speeds of approximately 25 and 35 r.p.m. with the rolls at a temperature of about 120° C. .1% of each retarder was incorporated into the polymer being tested. The polyethylene used in these studies was of commercial high molecular weight, high pressure polymer supplied by the Bakelite Company as DYNK.

The polypropylene used in the run plotted in FIG. 23 was Profax–6501 made by Hercules Powder Company which is a virgin, uninhibited polypropylene.

Test samples weighing 0.1 gram in the form of strips approximately 10 mils thick were cut from the polymeric material containing the antioxidant mixture. These strips were placed in a Pyrex glass tube attached to a mercury monometer together with about 2 grams of type 5–A Linde Molecular Sieve, a synthetic zeolite absorbent. The reaction vessel, after being successfully evacuated and filled with oxygen to assure a complete oxygen environment, was again filled with oxygen and was placed in an air-circulating strip-heater oven maintained at 140° C. and of such design to insure a variation of no more than 1° C. throughout the volume in the oven. The reaction vessel was immediately connected to an oxygen gas burette with a short length of polyvinyl chloride tubing. After reaching a temperature equilibrium at the said temperature of about 140° C., which took about 15 minutes, the system was adjusted to zero reading at atmospheric pressure. Readings of oxygen uptake were made as required at atmospheric pressure, one such reading being taken every 4 to 12 hours.

Referring again to the figures, the coordinates are oxygen-absorbed in cubic centimeters per gram of sample as measured on the mercury-filled manometer on the ordinate and time in hours on the abscissa. The plotted data were taken from a run in which the polymeric samples are maintained at a temperature of 140° C.

In interpreting curves such as these, it is here assumed that the useful properties of polyethylene and other polymeric materials included in the class previously set forth are not critically affected until the amount of oxygen absorbed by the polymer is of the order of .5% by weight.

This is equivalent to about 10 cubic centimeters of oxygen absorbed in the ordinate units.

Using this value of 10 cubic centimeters per gram sample which is denoted by a cross on each figure, it is readily apparent that each figure shows a significant synergistic effect in the curve representing the mixture of compounds according to the invention. Exceptions are, as aforementioned, the curves designated "non-syn." which show results of mixtures including lower conjugated compounds falling outside the scope of this invention (FIGS. 7, 8, 12, 13, 17, and 18).

Another factor often considered in evaluating antioxidant action is the length of the "induction" period. This is the period at which the antioxidant appears to break down completely offering no further effect so that the polymer appears to absorb oxygen at its normal, uninhibited rate. The induction period is obtained by extrapolating the curve beyond the point where a significant upswing in $O_2$ absorption occurs, i.e. point X in FIG. 2, back to the abscissa. The value obtained, Y in FIG. 2, is a measure of the length of time the antioxidant is effective. As is seen, some of the figures show curves which fail to show induction periods. However, in many of the curves it is evident that the synergism reflected by the increase in induction periods is even greater than that reflected in the other standard, i.e. oxygen absorption of 10 cubic centimeters per gram of sample.

In the accompanying FIGS. 7 through 23, the first two plots in each group, FIGS. 7, 8; 12, 13; 17 and 18 all show low degree conjugated compounds which do not show synergism with the typical sulfur compound. This provides the basis for limits. For instance, it is apparent with the cyclic alkenes that two double bonds in the alkene group (FIG. 8) are insufficient whereas three (FIG. 9) provide a high degree of synergism. With the condensed ring systems, three rings (FIG. 13) are not enough but four (FIG. 14) give surprising results. With the quinone compounds the simple quinones (FIGS. 17 and 18) do not exhibit synergism whereas the more complex quinones (FIGS. 19 through 23) do. Accordingly, these critical points provide a basis for valid lower limits. Theoretically, there is no upper limit on conjugated systems producing synergism but increasing rings and chains produce systems which are too high in molecular weight and too expensive to obtain. Accordingly, a maximum of 10 cyclic rings or 30 conjugated carbon atoms is considered appropriate.

Whereas specific compounds and groups of compounds have been herein set forth as appropriate for either component of the inventive synergistic antioxidant mixture, they are not intended as limiting the scope of this invention. It will be apparent to those skilled in the art that any compound having the same general character as those specifically set forth can be employed without departing from the scope of the appended claims.

What is claimed is:

1. A composition stabilized against oxidative degradation comprising a polymer of an alpha-mono-olefin containing at least two components, each of said components being included in an amount of at least 0.1% by weight and the maximum amount of both components together being 10% by weight, a first component selected from the group consisting of aromatic disulfides having the general formula $$R-S-S-R'$$

in which R and R' are ring structures each containing at least one carbon atom and in which the maximum number of carbon atoms in each of the said ring structures including substituents is 30, alkyl disulfides having the general formula $$R-S-S-R'$$

in which R and R' are alkyl radicals each containing from 4 to 30 carbon atoms, aromatic mercaptans having the general formula R—SH in which R is a ring structure containing from 1 to 30 carbon atoms, aliphatic mercaptans having the general formula $R(SH)_x$ in which R is an alkyl radical containing from 6 to 30 carbon atoms, and $x$ is an integer having a maximum value of two, aromatic thioethers having the general formula:

$$\left[ \begin{array}{c} \phantom{X} \\ R' \end{array} \hspace{-1em} \bigcirc \hspace{-1em} \begin{array}{c} OH \\ R \end{array} \right]_2 S$$

where R is selected from the group consisting of a normal alkyl group containing from 6 to 20 carbon atoms and a branched alkyl group containing from 3 to 6 carbon atoms, and R' is selected from the group consisting of hydrogen and a normal alkyl group containing up to 6 carbon atoms, and the total number of carbon atoms in R and R' does not exceed 30, diaryl thioethers having the general formula $$Ar-S-Ar'$$

in which Ar and Ar' are fused ring carbocyclic benzenoid aromatic radicals containing at least one substituent selected from the group consisting of hydroxyl radicals and secondary amine radicals and further in which compound the maximum number of carbon atoms in each fused ring moiety including substituents is 30, aliphatic thiuramdisulfides having the structure $$\begin{array}{c} R_1 \\ \diagdown \\ R_2 \end{array} N-\overset{S}{\underset{\|}{C}}-S-S-\overset{S}{\underset{\|}{C}}-N \begin{array}{c} \diagup R_3 \\ \diagdown R_4 \end{array}$$

in which $R_1$, $R_2$, $R_3$ and $R_4$ are aliphatic groups and in which the total number of carbon atoms contained in each of the substituent pairs $R_1$, $R_2$ and $R_3$, $R_4$ is from 2 to 30, and a second component selected from the group consisting of conjugated cyclic alkenes having the general formula:

$$R-(CH=CH-)_n-R'$$

where R and R' are conjugated cyclic radicals and $n$ is an integer greater than 2, condensed polynuclear compounds having greater than three unsaturated rings, quinones having the general formula:

$$O=\bigcirc[X]\bigcirc=O$$

where X is any conjugated system providing unbroken conjugation between the quinoid rings including a single double bond.

2. The composition of claim 1 wherein the polymer is polyethylene.

3. The composition of claim 1 wherein the polymer is polypropylene.

4. The composition of claim 1 wherein the second component comprises a conjugated cyclic alkene.

5. The composition of claim 1 wherein the second component comprises a condensed polynuclear compound.

6. The composition of claim 1 wherein the second component comprises a quinone.

7. The composition of claim 1 wherein the first component is an aromatic disulfide.

8. The composition of claim 1 wherein the first component is an alkyl disulfide.

9. The composition of claim 1 wherein the first component is an aromatic mercaptan.

10. The composition of claim 1 wherein the first component is an aliphatic mercaptan.

11. The composition of claim 1 wherein the first component is an aromatic thioether.

12. The composition of claim 1 wherein the first component is a diaryl thioether.

13. The composition of claim 1 wherein the first component is an aliphatic disulfide.

14. The composition of claim 1 wherein the first component is an aliphatic thiuramdisulfide.

15. A stabilized polymeric composition comprising a solid polymer of an alpha-olefin having incorporated therein at least two components, each of said components being included in an amount of at least 0.1% by weight, and the total amount of both components not exceeding 10% by weight, the first component selected from the group consisting of 4,4'-thiobis-(6-tert.-butyl-m-cresol), didodecyl disulfide, di-β-naphthyl disulfide, naphthalenethiol, tetramethyl thiuramdisulfide and mixtures thereof, and the second component selected from the group consisting of 3,5,3',5'-tetra-tert.-butyl-4,4'-diphenoquinone, 1,6-diphenylhexatriene, 1,8-diphenyl-1,3,5,7-octatetraene, β-carotene, naphthacene, pentacene, perylene, 3,5,3',5'-tetramethyl-4,4'-diphenoquinone, 3,3'-dimethyl-5,5'-di-tert.-butyl-4,4'-diphenoquinone, 3,5,3',5'-tetra-tert.-butyl-4,4'-stilbenequinone, and mixtures thereof.

References Cited by the Examiner
UNITED STATES PATENTS

| | | | |
|---|---|---|---|
| 2,691,642 | 10/1954 | Faulkner | 260—45.9 |
| 2,889,306 | 6/1959 | Hawkins et al. | 260—41 |
| 2,967,845 | 6/1959 | Hawkins et al. | 260—41 |
| 2,967,846 | 6/1959 | Hawkins et al. | 260—41 |
| 2,967,847 | 6/1959 | Hawkins et al. | 260—41 |
| 2,967,848 | 6/1959 | Hawkins et al. | 260—41 |
| 2,967,849 | 6/1959 | Hawkins et al. | 260—41 |
| 2,967,850 | 6/1959 | Hawkins et al. | 260—41 |
| 2,985,617 | 5/1961 | Salyer et al. | 260—45.9 |

LEON J. BERCOVITZ, *Primary Examiner.*

H. E. TAYLOR, *Assistant Examiner.*